April 2, 1946.   J. A. JORDAN, JR   2,397,741
TIRE SHIELD
Filed Dec. 1, 1943
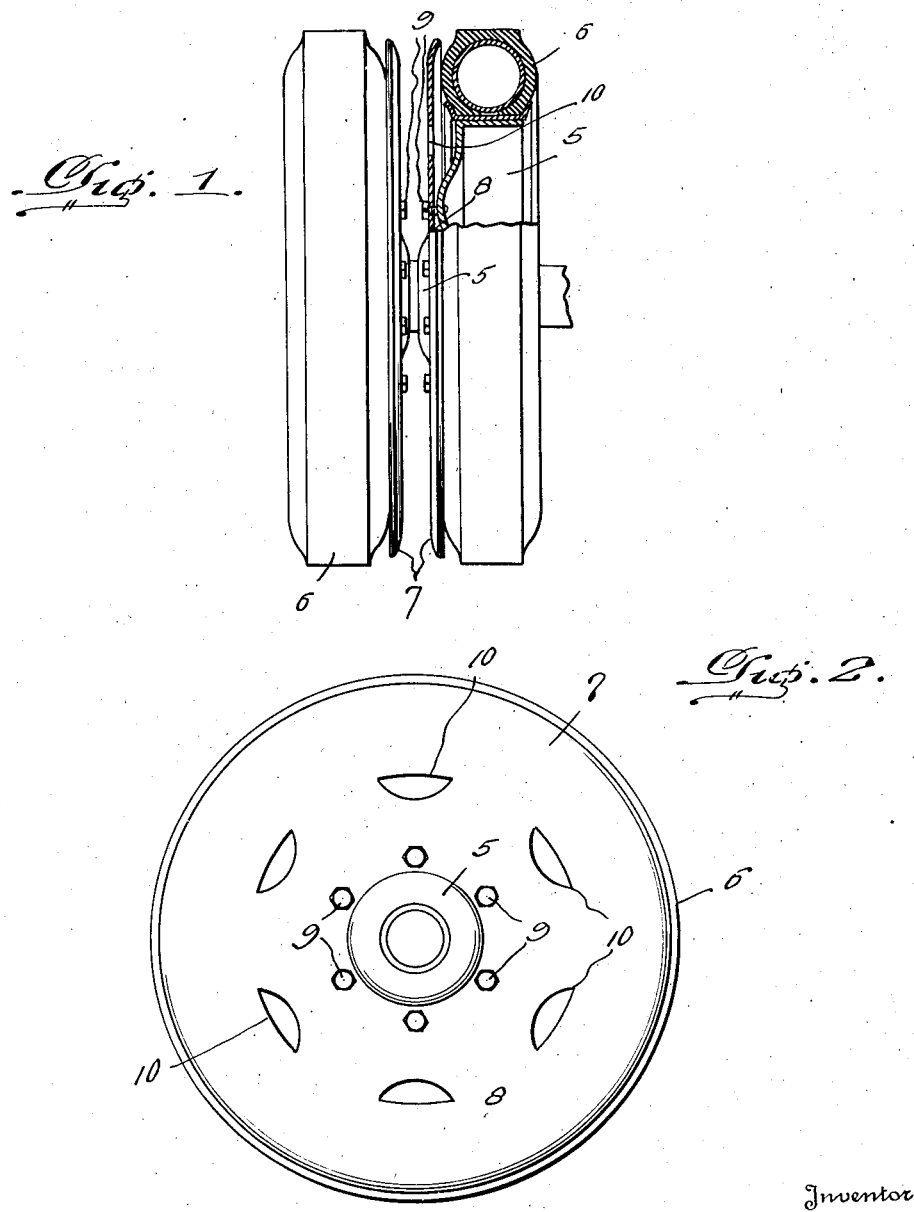
Inventor
Joseph A. Jordan, Jr, Patented Apr. 2, 1946

2,397,741

UNITED STATES PATENT OFFICE 2,397,741

TIRE SHIELD

Joseph A. Jordan, Jr., Camp Sibert, Ala.

Application December 1, 1943, Serial No. 512,506

3 Claims. (Cl. 301—36)

This invention relates to tire shields and has for the primary object the provision of a device of this character which is especially adapted to protect the opposing side walls of tires mounted on dual wheels from damage due to the lodging of stones and the like between the tires and which will not interfere with the normal activities of the tire and will permit said tires to only wear away such portions of the treads that will not destroy or injure the tires for recapping or retreading and further will support the wheel in case of a puncture or blowout to the tire and consequently eliminate any possibility of the tire being injured while deflated.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation, partly in section, illustrating dual motor vehicle wheels carrying tires equipped with protectors constructed in accordance with my invention, for the purpose of preventing stones and other objects which may lodge between the tires from injuring the walls of the tires.

Figure 2 is a side elevation illustrating one of the shields or protectors.

Referring in detail to the drawing, the numeral 5 indicates the dual wheels of a motor vehicle, 6 the tires thereof. It is a well known fact that the tires of dual wheels are subject to severe damage by stones or like obstacles wedging between the opposing side walls of the tires. The damaging effect on the tires is continuous as long as the stones remain wedged between the opposing walls of the tires due to the constant flexation of the tires during the rotation of the wheels. Further the tires are damaged to some extent when attempts are made to pry or otherwise remove the lodged stones from between the tires.

It is the purpose of the present invention to protect or shield the opposing walls of the tires from stones that may lodge between the wheels.

The present invention consists of companion protector plates 7 arranged between the wheels and spaced a limited distance from the opposing side walls of the tires so that any stones lodging between the wheels will be between the protector plates and be prevented from contacting with the tires. It is preferable that the plates 7 be constructed of a rigid durable material and each plate is provided with a hub opening 8 to receive the hub of a wheel and is secured on the wheel by stud bolts or like fasteners 9. The peripheries of the plates are spaced inwardly of the treads of the tires so that under normal conditions they will not contact the road surface during the rotation of the wheels. However, when the treads of the tires wear to an extent that would damage the tires for recapping or retreading, the peripheries of the plates become engaged with the ground and thereby relieve the tires of the support of the wheels consequently further wear on the tread of the tires. Also, should the tires become punctured or deflated from any cause the plates assume the load of the wheels preventing the tires from being run on while deflated.

The peripheral edges of the plates 7 are slightly offset laterally of the major portions of the plates so as to follow out the general contour of the tires adjacent the treads and thereby arranges the plates when applied to the wheels so close to the opposing walls of the tires that stones will be prevented from lodging between the plates and the walls of the tires. This construction maintains the plates sufficiently spaced from the opposing walls of the tires as to prevent chafing of the tires by the plates and also to permit air to circulate freely between the plates and the tires. The plates are provided with openings 10 to allow air to circulate through the plates which with the air admitted at the peripheral edges of the plates, will efficiently cool the brake drums to prevent overheating of the brakes.

The construction of the plates is such that their application to the wheels can be easily carried out or removed from the wheels whenever desired and will effectively protect the opposing walls of the tires of the dual wheels from injury by lodging stones and still permit sufficient circulation of air about the wheels and tires as to prevent overheating of the tires as well as the brake drums of the wheels.

While I have shown and described the preferred embodiment of my invention, it will be understood that minor changes in construction, combination and arrangement of parts may be made without departing from the spirit and scope of the invention as claimed.

Having thus described my invention, what I claim is:

1. In combination with dual wheels of a motor vehicle having tires thereon, and a pair of plates mounted on said wheels, one of the plates being positioned in closely spaced relation to the opposed sides of the respective tires to prevent the lodging of stones between the opposed walls of the tires.

2. In combination with dual wheels of a motor vehicle having tires thereon, a pair of plates mounted on said wheels and spaced a limited distance from the opposed sides of the respective tires to prevent the entrance and lodging of stones between the opposed walls of the tires, said plates having openings to permit air circulation between the plates and tires and about the drums of the wheels.

3. In combination with dual wheels of a motor vehicle having tires thereon, a pair of plates provided with centrally arranged openings to receive hubs of the wheels, fasteners securing the plates to the wheels, said plates spaced a limited distance from the opposed walls of the respective tires to prevent the entrance and lodging of stones between the opposed walls of the tires; and having openings to provide air circulation between the plates and the tires, said plates being of annular formation and having their peripheral edges laterally disposed of the major portions of said plates in the direction of the tires to conform to the contour of the tires and terminating adjacent the base of the tread portion of the tire to limit wear of the tread.

JOSEPH A. JORDAN, Jr.